Patented Jan. 19, 1943

2,308,763

UNITED STATES PATENT OFFICE 2,308,763

TEXTILE PRINTING PASTE

Bunyan H. Little, Wilmington, Del., assignor to Hercules Powder Company, Wilmington, Del., a corporation of Delaware No Drawing. Application June 14, 1941, Serial No. 398,062

13 Claims. (Cl. 106—26)

This invention relates to improved pigmented textile printing pastes and more particularly to such printing pastes containing an emulsion of a water-insoluble film-forming material as binder.

Textile printing in the past has been carried out with use of water solutions of dyestuffs containing water-soluble binding agents such as starches, gums, etc. The dyestuff has been fixed on the fabric after printing and the binder usually washed out of the printed fabric after the printing operation. Recently, use of insoluble pigments in the printing of textiles has been suggested and as binders therefor water-insoluble film-forming materials such as resins and cellulose derivatives have been suggested. In using the latter type of binder an emulsion is generally preferred. While the latter method of pigment printing presents many advantages it has been found that prints of satisfactory uniformity and of satisfactory penetration into the fabric, particularly in the portions where the warp and fill threads cross, have been difficult, even impossible to obtain.

It is an object of this invention to provide pigmented textile printing pastes containing water-insoluble film-forming materials as binders which provide improved penetrating characteristics.

It is another object to provide pigmented textile printing pastes containing water-insoluble film-forming materials as binders which penetrate deeply into the fabric and thoroughly print the portions where the warp and fill threads cross.

Other objects of the invention will appear hereinafter.

It has been found in accordance with this invention that pigmented textile printing pastes prepared with use of emulsions of water-insoluble film-forming materials as binders are considerably improved in their penetrating characteristics by inclusion of a small amount of a terpene ether in the paste as a penetrating agent. Thus, it has been found that by inclusion of a terpene ether in such printing pastes it is possible to provide materially improved printing effects on fabrics and particularly to provide fabrics which are very thoroughly and evenly printed with the coloring component. It has been the practice to employ a petroleum hydrocarbon as a solvent in the pigmented printing pastes containing the water-insoluble binders, and the terpene ether may be substituted for a part of such petroleum hydrocarbon and in some instances for all of the petroleum hydrocarbon.

The terpene ethers which provide the penetrating characteristics utilized in this invention are the ethers obtained with either monohydric or polyhydric alcohols. By reaction of unsaturated terpene compounds with ether monohydric or polyhydric alcohols in the presence of suitable catalysts, as is well known in the art, additive terpene ethers result in which the alcohol adds directly to the unsaturated bond of the terpene. In producing such additive ethers unsaturated monocyclic terpene compounds such as for example, dipentene, terpinene, terpinolene, phellandrene, sylvestrene, alpha-terpineol, beta-terpineol, terpineol, etc., or unsaturated complex cyclic terpenes capable of isomerization to unsaturated monocyclic terpene compounds such as alpha-pinene, beta-pinene, carene, etc., or cyclic terpenes which will not readily isomerize to monocyclic terpenes such as nopinene, camphene and bornylene may be employed. The terpene compounds need not be in the form of pure compounds for the purpose of the preparation of the ether but may be used in the form of crude natural mixtures of terpene compounds as for example, turpentine, pine oil, etc. In producing such additive terpene ethers, monohydric alcohols as for example methyl alcohol, ethyl alcohol, propyl alcohol, butyl alcohol, amyl alcohol, benzyl alcohol, lauryl alcohol, etc., halogen substituted monohydric alcohols as ethylene chlorhydrin, etc., may be employed. Polyhydric alcohols such as ethylene glycol, propylene glycol, diethylene glycol, triethylene glycol, trimethylene glycol, glycerol, pentaerythritol, etc., may be used to provide the polyhydric alcohol terpene ethers. The ethers obtained from polyhydric alcohols, particularly from the glycols are preferred in the compositions of the invention since such ethers provide the penetrating characteristics to the greatest extent. The terpene ethers are generally characterized as relatively high boiling liquids.

The water-insoluble pigment which comprises the coloring component of the printing pastes in accordance with the invention may be either the inorganic or the organic coloring materials which are insoluble in either water or oil and which are commonly used in printing pastes. The water-insoluble film-forming materials comprise either a resin such as a urea-formaldehyde resin, an alkyd resin or a cellulose derivative such as ethyl cellulose. The film-forming material may be plasticized, if desired, or in the case of a cellulose derivative may be blended with a resinous material as for example an alkyd resin, a polyhydric alcohol ester of a rosin, etc.

The emulsion containing the film-forming material as binder may be either of the oil-in-water type or of the water-in-oil type. However, emulsions of the water-in-oil type will be particularly preferred since such emulsions themselves present better penetrating qualities than the oil-in-water emulsions due to their containing the water in the internal phase, the fabric thereby coming directly in contact with the solution of the binder. The emulsion will comprise a solution of the film-forming material dissolved in a suitable water-immiscible solvent mixture and such a solution will generally be prepared prior to the emulsification and the solvent solution will be emulsified in water by any suitable means. Suitable solvents and solvent mixtures will include solvents such as for example light aromatic hydrocarbons, as toluol, xylol, Hi-flash naphtha, etc.; petroleum hydrocarbons, as Stoddard solvent, Solvesso No. 2 and No. 3, etc.; alcohols such as butanol, etc.

The oil-in-water type emulsions may be prepared by emulsifying a solution of the film-forming material in the solvent by means of an emulsifying agent as for example, an alkali metal salt of a higher aliphatic acid sulfate, an alkali metal salt of an alkyd naphthalene sulfonic acid, a soap such as potassium oleate, sodium oleate, etc. The water-in-oil type emulsions may be conveniently prepared by emulsifying the solution of the film-forming material with water without an emulsifying agent or by addition of a suitable reversing agent such as aluminum stearate, acetic acid, or an alkali to the oil-in-water type emulsion, or by other means known to the art.

The printing paste will generally be prepared by mixing the insoluble pigment in the emulsion of the film-forming material with suitable adjustment of the pigment to binder ratio. The pigment may be used in the form of a suspension in water such as a pulp pigment or may be used in the dry form, or may be previously mixed into a paste with water or with an emulsifying agent. It is generally the practice in formulating printing pastes of this type to include a solvent and particularly a petroleum hydrocarbon solvent such as Stoddard solvent, Solvesso No. 2, Solvesso No. 3, etc., to provide proper flowability of the printing paste. In accordance with this invention such additional solvent may be replaced by the terpene ether or a portion of such may be replaced with the terpene ether. However, it is also possible to introduce the terpene ether in the emulsion of the film-forming material prior to mixing with the pigment. In any event the terpene ether will be present in the paste intimately associated with the binding vehicle and will thus exert its penetrating characteristics regardless of the point at which it is incorporated in the printing paste.

The amount of terpene ether which may be incorporated may be varied widely to produce the desired penetrating effect. Generally speaking, however, an amount of terpene ether in excess of about 45% based on the total weight of the printing paste will not be required. Preferably, however, the amount of terpene ether used will be in the range of about 2% to about 30% of the total weight of printing paste.

The method of applying the printing pastes described in accordance with this invention to a textile fabric will involve the steps of applying the paste to the fabric by means of printing rollers or screens followed by drying of the printed fabric in any suitable manner. The temperature of drying for example may be within the range of about 180° to about 320° F. and preferably from about 220° F. to about 300° F. No after development or washing of the printed fabric is necessary and simply drying of the fabric will provide the printed design on the fabric in a highly uniform and thoroughly penetrated manner. The printed fabric obtained will be characterized by containing the coloring component deposited uniformly throughout the threads of the fabric and particularly in the portions where the warp and fill threads cross. The printed fabric will be substantially resistant to crocking and to laundering. The advantages of the invention are particularly significant in the printing of greige goods, where the wax content of the fabric severely impairs penetration of the prior art pastes. The high penetrating qualities of the terpene ethers provide the required degree of penetration through the wax and thereby make possible superior prints to those heretofore obtainable on greige fabrics.

The following examples are illustrative of the improvements obtainable in accordance with this invention.

*Example I*

A solution was prepared of the following constituents:

| | Parts by weight |
|---|---|
| Ethyl cellulose (high viscosity) | 32 |
| Triphenyl phosphate | 10 |
| Glycerol ester of hydrogenated rosin | 16 |
| Xylol | 106 |
| Butanol | 16 |
| Hi-flash naphtha | 20 |

This solution was then emulsified with 100 parts by weight of water containing 1.5 parts by weight of potassium oleate. The oil-in-water type emulsion resulting was converted into a water-in-oil type emulsion by adding to it with stirring 120 parts by weight of a 6% solution of aluminum stearate in pine oil and 1.5 parts by weight of acetic acid. A smooth water-in-oil type emulsion resulted on stirring. A printing paste was then prepared with use of the above water-in-oil emulsion according to the following formula:

| | Parts by weight |
|---|---|
| Above emulsion | 20 |
| Solvesso No. 2 | 14 |
| Terpinyl glycol ether | 12 |
| Monastral Fast Blue GS pdr | 3 |
| Water | 51 |

The paste was produced by mixing the emulsion, the solvent, the terpene ether, and the pigment together with a mechanical mixer and then adding the water slowly with continued stirring. The printing paste formed was then passed through a colloid mill for homogenization. In its prepared form the finished paste contained 12% by weight of the terpene ether. It was used to print 80 x 80 print cloth and also 44 x 60 5.00 yard sheeting from a printing roll and the printed fabrics were dried over heated rolls at a temperature of 240° F. As a result prints characterized by a high degree of uniformity and by thorough penetration in the portions where the warp and fill threads cross were obtained. A comparable printing paste prepared with use of 25 parts of toluol and 1 part of butanol in place of the Solvesso No. 2 and the terpinyl glycol ether in the above formula gave prints of poorer impregnation than the above and the printed fabrics, particularly the greige sheeting, exhibited poor coverage in the portions where the warp and fill threads cross.

Example II

A solution was prepared from the following ingredients:

| | Parts by weight |
|---|---|
| Ethyl cellulose (high viscosity) | 32 |
| Glycerol ester of hydrogenated rosin | 26 |
| Xylol | 106 |
| Butanol | 16 |
| Hi-flash naphtha | 20 |
| Pine oil | 20 |
| Stoddard solvent | 130 |

A water-in-oil emulsion was prepared from the above lacquer by adding 20 parts by weight of Solvesso No. 2 to 26 parts by weight of lacquer and then adding 53.5 parts by weight of water and 0.5 part by weight of acetic acid slowly with stirring. A thick and smooth water-in-oil type emulsion resulted. A printing paste was then prepared from the above emulsion according to the following formulation:

| | Parts by weight |
|---|---|
| Ethyl cellulose emulsion | 50 |
| Solvesso No. 2 | 11 |
| Terpinyl glycol ether | 4 |
| Monastral Fast Blue GS pdr | 3 |
| Water | 31 |
| Ammonium hydroxide (28%) | 1 |

The printing paste was prepared by stirring together the water-in-oil emulsion, the solvent, the terpene ether and the pigment and then adding the water slowly with stirring followed by addition of the ammonium hydroxide. The printing paste was then passed through a homogenizer. The smooth printing paste resulting was printed on 80 x 80 print cloth and also on 44 x 60 5.00 yard sheeting and the printed fabric dried over heated rolls at 240° F. The print obtained was deeply penetrated in both fabrics and the portions where the warp and fill threads cross were evenly printed. A comparable paste prepared by substitution of Solvesso No. 2 for the terpinyl glycol ether produced prints showing less penetration into the cross linkages of the warp and fill threads and less penetration into the fabric, particularly in the case of the greige fabric.

Example III

A water-in-oil type emulsion was prepared using a urea-formaldehyde resin as the film-forming ingredient. The emulsion had the following composition:

| | Parts by weight |
|---|---|
| Urea-formaldehyde resin | 30 |
| Solvesso No. 2 | 38 |
| Water | 32 |

Using the above emulsion a printing paste was prepared according to the following formulation:

| | Parts by weight |
|---|---|
| Urea-formaldehyde emulsion | 10 |
| Terpinyl glycol ether | 15 |
| Aridye Green LJ3B | 20 |
| Water | 55 |

The printing paste was prepared by mixing the emulsion, the solvent, the terpene ether and the color together with stirring and then adding the water with continued stirring. The paste was then homogenized. Prints on 80 x 80 print cloth and on 44 x 60 5.00 yard sheeting were made using the above paste and the printed fabrics dried over heated rolls at 240° F. The printed fabrics obtained exhibited deep penetration of the color and the portions where the warp and fill threads crossed were evenly covered. A comparable paste prepared with use of Solvesso No. 2 in place of the terpinyl glycol ether gave prints of less penetration and lower uniformity, particularly in the case of the greige sheeting.

It will be understood that the details and examples hereinbefore set forth are illustrative only and that the invention as broadly described and claimed is in no way limited thereby.

What I claim and desire to protect by Letters Patent is:

1. A textile printing paste comprising a pigment dispersed in an emulsion comprising a solution of a water-insoluble film-forming agent in a volatile water-immiscible organic solvent, said paste containing a terpene ether as a penetrating agent.

2. A textile printing paste comprising a pigment dispersed in a water-in-oil type emulsion comprising a solution of a water-insoluble film-forming agent in a volatile water-immiscible organic solvent, said paste containing a terpene ether as a penetrating agent.

3. A textile printing paste comprising a pigment dispersed in an oil-in-water type emulsion comprising a solution of a water-insoluble film-forming agent in a volatile water-immiscible organic solvent, said paste containing a terpene ether as a penetrating agent.

4. A textile printing paste comprising a pigment dispersed in an emulsion comprising a solution of a water-insoluble ethyl cellulose in a volatile water-immiscible organic solvent, said paste containing a terpene ether as a penetrating agent.

5. A textile printing paste comprising a pigment dispersed in a water-in-oil type emulsion comprising a solution of a water-insoluble ethyl cellulose in a volatile water-immiscible organic solvent, said paste containing a terpene ether as a penetrating agent.

6. A textile printing paste comprising a pigment dispersed in a water-in-oil type emulsion comprising a solution of a water-insoluble film-forming agent in a volatile water-immiscible organic solvent, said paste containing a terpene ether of a monohydric alcohol as a penetrating agent.

7. A textile printing paste comprising a pigment dispersed in a water-in-oil type emulsion comprising a solution of a water-insoluble film-forming agent in a volatile water-immiscible organic solvent, said paste containing a terpene ether of a polyhydric alcohol as a penetrating agent.

8. A textile printing paste comprising a pigment dispersed in a water-in-oil type emulsion comprising a solution of a water-insoluble film-forming agent in a volatile water-immiscible organic solvent, said paste containing a terpene ether of a glycol as a penetrating agent.

9. A textile printing paste comprising a pigment dispersed in a water-in-oil type emulsion comprising a solution of a water-insoluble film-forming agent in a volatile water-immiscible organic solvent, said paste containing an ethylene glycol ether of terpineol as a penetrating agent.

10. A textile printing paste comprising a pigment dispersed in a water-in-oil type emulsion comprising a solution of a water-insoluble film-forming agent in a volatile water-immiscible organic solvent, said paste containing a methyl ether of terpineol as a penetrating agent.

11. A textile printing paste comprising a pigment dispersed in a water-in-oil type emulsion comprising a solution of a water-insoluble film-forming agent in a volatile water-immiscible organic solvent, said paste containing a terpene ether in sufficient amount to provide a high degree of penetration of the printing paste.

12. A textile printing paste comprising a pigment dispersed in a water-in-oil type emulsion comprising a solution of a water-insoluble film-forming agent in a volatile water-immiscible organic solvent, said paste containing an amount up to about 45% by weight of a terpene ether as a penetrating agent.

13. A textile printing paste comprising a pigment dispersed in a water-in-oil type emulsion comprising a solution of a water-insoluble film-forming agent in a volatile water-immiscible organic solvent, said paste containing an amount up to about 45% by weight of a terpinyl glycol ether as a penetrating agent.

BUNYAN H. LITTLE.